(12) United States Patent
Rieken et al.

(10) Patent No.: US 8,826,966 B1
(45) Date of Patent: Sep. 9, 2014

(54) MELT CONTAINMENT MEMBER

(75) Inventors: Joel R. Rieken, Nevada, IA (US); Andrew J. Heidloff, West Des Moines, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 13/573,211

(22) Filed: Aug. 30, 2012

Related U.S. Application Data

(62) Division of application No. 12/928,702, filed on Dec. 16, 2010, now abandoned.

(60) Provisional application No. 61/284,514, filed on Dec. 21, 2009.

(51) Int. Cl.
*B22C 3/00* (2006.01)
*B22D 11/00* (2006.01)
*B22D 25/02* (2006.01)
*B22D 25/00* (2006.01)
*B29C 67/00* (2006.01)

(52) U.S. Cl.
CPC ............... *B22D 25/00* (2013.01); *B22D 11/00* (2013.01); *B22D 25/02* (2013.01); *B29C 67/0014* (2013.01)
USPC ............. 164/72; 164/138; 164/459; 222/590; 266/280

(58) Field of Classification Search
None
See application file for complete search history.

(56) References Cited

U.S. PATENT DOCUMENTS 1,082,308 A    12/1913  Crane
3,734,480 A *  5/1973  Zanis et al. .................... 266/275
4,723,764 A    2/1988  Mizuhara ....................... 266/275
5,443,892 A    8/1995  Holcombe et al. ............. 428/216
6,358,466 B1 * 3/2002  Besser et al. ................... 266/234
2005/0236134 A1* 10/2005  Poloni et al. .................. 164/480

FOREIGN PATENT DOCUMENTS

DE           199 09 952 A1    9/1999

OTHER PUBLICATIONS

R.L. Helferich, et al. "An Investigation of Yttrium Oxide as a Crucible Material for Melting Titanium", Naval Ship Research and Development Center, Jan. 1973.*
A. Kostov, et al., Predicting thermodynamic stability of crucible oxides in molten titanium and titanium alloys, Computational Materials Science 38, 2006, pp. 374-385.
A. Kostov, et al., Selection of Crucible Oxides in Molten Titanium and Titanium Aluminum Alloys by Thermo-Chemistry Calculations, Journal of Mining and Metallurgy, 41B, 2005, pp. 113-125.
N.M Griesenauer, et al., Vacuum Induction Melting of Titanium, J. Vac. Sci. Technol., vol. 9, No. 6, Nov.-Dec. 1972.

(Continued)

*Primary Examiner* — Kevin P Kerns
*Assistant Examiner* — Jacky Yuen

(57) ABSTRACT

A tubular melt containment member for transient containment of molten metals and alloys, especially reactive metals and alloys, includes a melt-contacting layer or region that comprises an oxygen-deficient rare earth oxide material that is less reactive as compared to the counterpart stoichiometric rare earth oxide. The oxygen-deficient (sub-stoichiometric) rare earth oxide can comprise oxygen-deficient yttria represented by $Y_2O_{3-x}$ wherein x is from 0.01 to 0.1. Use of the oxygen-deficient rare earth oxide as the melt-contacting layer or region material reduces reaction with the melt for a given melt temperature and melt contact time.

4 Claims, 2 Drawing Sheets

(56) References Cited

OTHER PUBLICATIONS

J.P. Kuang, et al., Investigation into refractories as crucible and mould materials for melting and casting γ-TiAl alloys, Materials Science and Technology, Sep. 2009, vol. 16, pp. 1007-1016.

J. Barbosa, et al., Influence of superheating on casting of γ-TiAl, Intermetallics 15, 2007, pp. 945-955.

J. Barbosa, et al., Influence of crucible material on the level of contamination in TiAl using induction melting, Int. J. Cast.Metals Res., 2000, 12, pp. 293-301.

J. Barbosa, et al., Evaluation of $Y_2O_3$ as front layer of ceramic crucibles for vacuum induction melting of TiAl based alloys, TMS(The Minerals, Metals & Materials Society) 2005, Proceedings, pp. 573-584.

C.E. Holcombe, et al., Consideration of Yttria for Vacuum Induction Melting of Titanium, Metallurgical Transactions B, vol. 14B, Sep. 1983, pp. 497-499.

Dr. Reiner Schober, et al., Thermal Shock and Corrosion Behavior of Coated Crucibles for Induction Melting of Titanium, Papers, cfi/Ber. DKG 84, (2007) No. 9, pp. E120-E124.

S.R. Lyon, et al., The Interaction of Titanium with Refractory Oxides: Titanium Science and Technology, pp. 271-284, 1973.

Antonin Dlouhy, et al., Refractory Crucible Melting and Related Mechanical Properties of Nb-Containing TiAl Alloys, TMS(The Minerals, Metals and Materials Society) 2008, , pp. 9-14.

* cited by examiner

US 8,826,966 B1

MELT CONTAINMENT MEMBER

This application is a division of U.S. application Ser. No. 12/928,702 filed Dec. 16, 2010, now abandoned which claims priority and benefits of U.S. provisional application Ser. No. 61/284,514 filed Dec. 21, 2009, the disclosures of which are incorporated herein by reference.

CONTRACTUAL ORIGIN OF THE INVENTION

This invention was made with government support under Grant No. DE-AC02-07CH11358 awarded by the U.S. Department of Energy. The Government has certain rights in the invention.

FIELD OF THE INVENTION

The present invention relates to a melt containment member for transient containment of molten metals or alloys, especially highly reactive metals and alloys.

BACKGROUND OF THE INVENTION

When considering traditional refractory materials for primary metallurgical processing of most metals, the oxides of aluminum, $Al_2O_3$, silicon, $SiO_2$, and zirconium, $ZrO_2$ are exclusively used. They are embodied in either transient melt containment members, such as pour tubes, or as containment vessels for casting.

Highly reactive metals (e.g., titanium and zirconium) are extremely difficult to handle in their molten state due to their extreme corrosive nature. Many times these materials are processed in water-cooled copper, where a thin layer of molten material solidifies on the water-cooled copper and forming a "skull". This skull therein provides a boundary layer between the molten material and the water-cooled copper. Much power is required to maintain a melt as significant power/heat is extracted from the water-cooled copper through the skull. This method of processing has been used for both transient melt containment members such as pour tubes, or as casting containment vessels. However, due to the nature of the water-cooled copper, limited geometrical variations are possible.

One other such material that has been tested as a substitute for water-cooled copper casting is stoichiometric rare earth (RE) oxides (i.e., $RE_xO_y$, where RE could be Y, La, or the like). RE oxides are more thermodynamically stable compared to the aforementioned traditional refectory materials (i.e., $Al_2O_3$, $SiO_2$, and $ZrO_2$), and thus have been considered as a mold material for the casting of titanium and titanium alloys (see N. M. Griesensuer, S. R. Lyon, C. A., Alexander, "Vacuum induction melting of titanium," J. Vac. Sci. and Tech., vol. 9, pp. 1351-1355, 1972). This study determined that $Y_2O_3$ showed the least amount of reaction with stagnant molten titanium when compared to other RE oxides. As a result of this study, $Y_2O_3$ is and has been the main stay of protection when reactive metals are being cast without the use of a water-cooled copper mold. The method of using $Y_2O_3$ as a casting mold material is predominantly embodied as a coating on lower cost ceramics such as $Al_2O_3$, $SiO_2$, $ZrO_2$ and mixtures thereof. However, $Y_2O_3$ does have limitations with respect to its protection for extended times or increased melt superheat (i.e., temperature above the melting point). For example, as indicated in the aforementioned study (Griesensuer et al. 1972), increased time or superheat will cause dissolution of the $Y_2O_3$ into the molten titanium causing contamination beyond chemical specification.

For transient melt containment of reactive metals, water-cooled copper nozzles have been utilized for free-fall gas atomization, however, extensive induction and/or plasma power supplies are required to prevent freeze-out and little to no superheat is generated within the melt. One refractory material that has been utilized with moderate success as a transient containment member is graphite. While significant melt superheats are physically possible, significant carbon contamination results and renders the material useless in an industrial perspective. U.S. Pat. No. 6,358,466 describes the only known embodiment of a RE oxide as a transient melt containment member wherein a composite pour tube is fabricated by multiple plasma spray layers.

SUMMARY OF THE INVENTION

The present invention provides a melt containment member for transient containment of molten metals and alloys, especially reactive metals and alloys, wherein a melt-contacting layer or region of the containment member comprises an oxygen-deficient rare earth oxide material as compared to the counterpart stoichiometric rare earth oxide. For purposes of illustration and not limitation, the oxygen-deficient (sub-stoichiometric) rare earth oxide can comprise oxygen-deficient yttria represented by $Y_2O_{3-x}$ wherein x is from 0.01 to 0.1. Use of the oxygen-deficient rare earth oxide as the melt-contacting layer or region material reduces reaction with the melt for a given melt temperature and melt contact time. This reduced reaction provides a means of maintaining the strict chemical purity specifications stated for various commercial products and applications.

In an illustrative embodiment of the invention, a composite tubular melt containment member is provided comprising an inner melt-contacting layer comprised of the oxygen-deficient rare earth oxide such as oxygen-deficient yttria, a heat-generating material disposed on the inner melt contacting layer, and an optional outer thermal insulating layer. The layers of the composite tubular melt containment member can be thermally sprayed layers. The inner melt-contacting layer can be thermally sprayed onto a mandrel as the stoichiometric oxide and then transformed using different embodiments of the invention to change the thermally sprayed layer from a substantially stoichiometric rare earth oxide layer to an oxygen-deficient (sub-stoichiometric) rare earth oxide layer. For example, this oxygen-deficient transformation can be conducted by 1) elevated temperature heat treatment within an oxygen deficient environment or 2) in-situ within the melt processing apparatus, such as within an atomization chamber, using molten material flow. Heat treatment can comprise heating the thermally sprayed yttria layer at a temperature of greater than 1700° C. in vacuum, or other oxygen deficient environment, for a time to produce an oxygen-deficient yttria melt-contacting layer represented by $Y_2O_{3-x}$ wherein x is from 0.01 to 0.1. In-situ transformation can comprise flowing a molten material with sufficient oxygen affinity through an atomization pour tube with an inner layer of stoichiometric yttria (i.e., $Y_2O_3$) for sufficient time, thereby transforming at the melt-contacting interface the original stoichiometric yttria layer to oxygen-deficient yttria, represented by $Y_2O_3$, where x is from 0.01 to 0.1, prior to initiating the atomization process (i.e., turning on the atomization gas).

A tubular melt containment member can comprise an elongated melt supply tube or pour tube in certain illustrative embodiments of the invention. For example, the pour tube can be used for the atomization of highly reactive metals, specifically titanium and titanium alloys, wherein use of a highly stable and less reactive pour tube will result in production of metallic powders that will contain significantly less interstitial impurities (e.g., oxygen) which, when consolidated, yields a consolidated powder metal or alloy body with improved mechanical and chemical properties.

A tubular melt containment member can comprise an elongated transient melt containment member for use as a continuous casting mold in certain other illustrative embodiments of the invention wherein use of a highly stable and less reactive casting mold will result in production of a cast product that will contain significantly less interstitial impurities (e.g., oxygen).

Other advantages and features of the present invention will become apparent from the following detailed description taken with the following drawings.

DETAILED DESCRIPTION OF THE INVENTION

The present invention provides a tubular melt containment member for transient containment of molten metals and alloys, especially reactive metals and alloys such as titanium and its alloys and zirconium and its alloys. The melt containment member comprises a melt-contacting layer or region that is comprised of oxygen-deficient rare earth oxide material as compared to the counterpart stoichiometric rare earth oxide to reduce reaction with the melt at a given melt temperature and contact time. The present invention seeks to reduce the high affinity of interstitials (e.g., such as oxygen) to be in solution within the reactive molten metal or alloy. Although the invention is described herebelow with respect to a melt containment member having an oxygen-deficient yttria melt-contacting layer, the invention is so limited and can be practiced with other containment members having a melt-contacting layer comprised of other rare earth oxides that can include, but are not limited to, oxygen-deficient $La_2O_3$, $Ce_2O_3$, $Gd_2O_3$, $Er_2O_3$, and any combination thereof.

The aforementioned melt-contacting material can be described as: oxygen deficient, sub-stoichiometric, or sub-oxide. The use of sub-stoichiometric oxide for reduced chemical attack by aggressive molten metal melts thereby facilitates conforming to the strict chemical purity specifications for a variety of commercial products and applications. The decreased reaction is due to the reduction in chemical potential gradients since the kinetics or speed of a reaction is dictated by the gradient or difference between the energy states of the two materials. This reduction does not work indefinitely as reducing the oxygen content of the RE oxide by virtue of elimination, increases the relative yttrium content within the oxide. If the yttrium content becomes high enough, the yttrium chemical potential gradient will be such that yttrium metal will dissolve into the molten titanium. Therefore a balance must be applied where the oxygen content is lowered to decrease the rate of reaction with the molten titanium and maintain sufficient oxygen content as to not allow for excessive dissolution of yttrium metal into the molten titanium.

Figure 1:
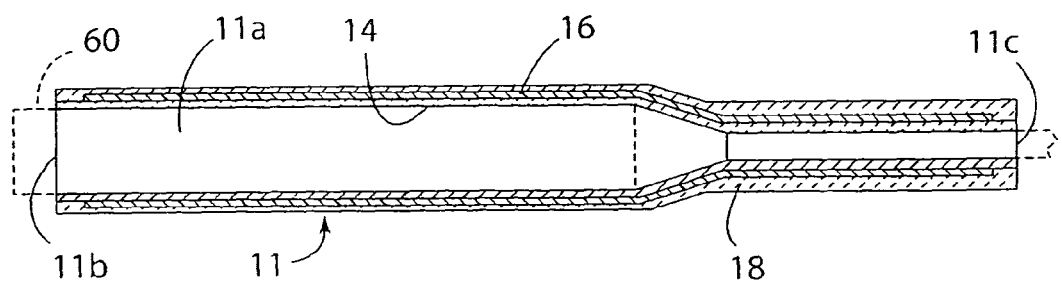
FIG. 1 is a longitudinal sectional view of a composite pour tube according to an embodiment of the invention.

An illustrative embodiment of the present invention involves a composite atomizer pour tube 11, FIG. 1, for use in a gas atomization apparatus as described in U.S. Pat. No. 6,358,466 of common assignee, the teachings of which are incorporated herein by reference. The gas atomization apparatus using a melt pour tube 11 of somewhat different shape is shown in FIG. 2 to illustrate the context of use of the atomizer pour tube.

Figure 2:
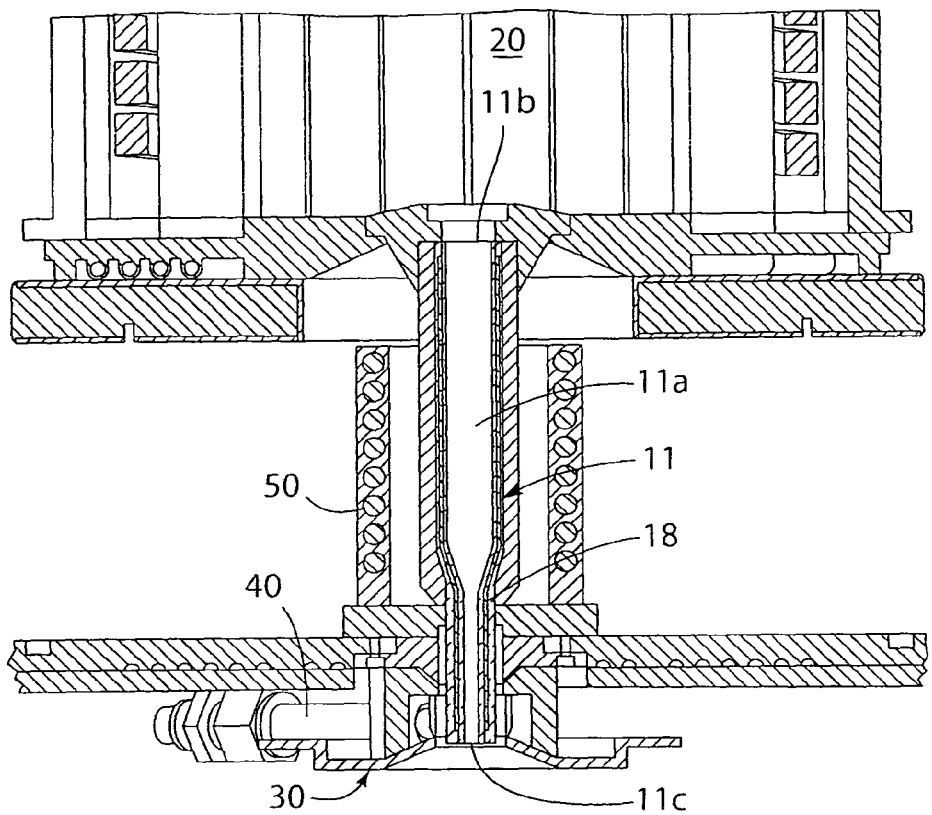
FIG. 2 is a sectional view of high pressure gas atomizing apparatus showing a composite melt pour tube of somewhat different shape from that of FIG. 1 positioned between a melting crucible and gas atomizing nozzle.

Pursuant to an illustrative embodiment of the present invention, the composite pour tube 11 includes a melt supply passage 11a between a melt entry open end 11b and a melt exit open end 11c and further comprises an oxygen-deficient (sub-stoichiometric) yttria inner melt-contacting layer 14 for contacting the melt flowing through the passage 11a from a crucible 20 to the atomizing nozzle 30, FIG. 2. The oxygen-deficient yttria melt-contacting layer 14 is formed by thermally spraying stoichiometric yttria particles onto a fugitive mandrel 60 machined from a solid graphite cylinder as described in U.S. Pat. No. 6,358,466, the teachings of which are incorporated herein by reference. The mandrel 60 is shown by dashed lines in FIG. 1 since it has been removed in a prior step as described below.

In particular, stoichiometric yttria ($Y_2O_3$) particles having a particle size greater than 10 microns diameter and less than 70 microns diameter are thermally sprayed and available from Norton Ceramics, Worchester, Mass. The $Y_2O_3$ particles are thermally sprayed using commercially available Praxair SG-100 plasma arc gun available from Praxair Surface Technologies and operated under the following conditions and parameters:

Anode—Praxair part no. 3083-145
Cathode—Praxair part no. 3083-129
Gas injector—Praxair part no. 3083-130
Electrical current—900 amperes
Voltage at high frequency—43.6 Volts
Ar aarc gas flow rate—37.8 slpm (standard liters/minute)
He auxiliary gas flow rate—20 slpm
Powder feed rate—5.6 grams/minute
Spray distance—10 centimeters
Gun cooling air wand (Praxair part number 5004566) and cooling jets with total flow rate of 1500 slpm The as-deposited thickness of the thermally sprayed yttria layer on the mandrel can be in the range of about 0.5 to about 1.5 millimeters.

Once the inner yttria layer is thermally sprayed, the graphite mandrel 60 is selectively removed by heating to a temperature of 1000° C. in air for 10 hours to produce $CO_2$ gas that freely evolves, causing the mandrel to "evaporate." The graphite mandrel with the thermally sprayed yttria layer thereon is placed on a bed of yttria powder during this mandrel removal operation.

At this juncture, the practice of the invention can be conducted by various methods. The heat-treatment of the tubular yttria layer at temperatures, vacuum, and time sufficient for the transformation to conclude, and/or the in-situ transformation method as described below.

If the heat-treatment step is employed pursuant to the present invention, the tube formed by the as-deposited, thermally sprayed inner melt-contacting layer 14 (liberated from the mandrel) then is heat treated under conditions to sinter the thermally sprayed layer and change the thermally sprayed layer from a substantially stoichiometric yttria layer to an oxygen-deficient (sub-stoichiometric) yttria layer. For purposes of illustration and not limitation, the as-deposited, thermally sprayed inner layer 14 is subjected to a heat treatment at a temperature of 2000° C. in vacuum of $1 \times 10^{-5}$ torr (or other oxygen deficient environment) for 2 hours. The tube formed by the liberated thermally sprayed inner metal contacting layer 14 in a tantalum-lined graphite crucible during this heat treatment. Other heat treatments which can be used in practice of the invention to convert the yttria layer to the oxygen-deficient yttria layer can involve heat treating high-purity monolithic refractory (Ta, Nb, W) crucibles with the stoichiometric yttria layer at a temperature of 1800° C. in a vacuum of $1 \times 10^{-6}$ torr for 8 hours.

This transformation changes the white-colored, as-deposited, thermally sprayed stoichiometric yttria ($Y_2O_3$) inner melt-contacting layer to a black-colored oxygen-deficient (sub-stoichiometric) sintered yttria inner melt-contacting layer 14 represented by $Y_2O_{3-x}$ wherein x is from 0.01 to 0.1, which is less reactive with reactive molten titanium and its alloys, for example, than a counterpart stoichiometric yttria inner melt-contacting layer is.

Once the heat treatment of the tube formed by the liberated inner melt-contacting layer 14 is completed, the tube is plasma sprayed with a heat-generating (e.g. tungsten) layer 16 (about 1 mm thick and a few mm short of the full length on both ends of the tube) to suscept to an induction field for concentrating the heating effect. The layer 16 is heat-generating by virtue of being able to suscept to an induction coil 50 (FIG. 2) as described in U.S. Pat. No. 6,358,466 during gas atomization of a melt. A final optional thermal insulating (e.g. yttria-stabilized-zirconia (YSZ)) layer 18 with a thickness of about 1 mm or greater can be plasma sprayed on the heat-generating layer 16 to encapsulate the layer 16 and to act as a thermal insulator for the exterior of the pour tube, FIG. 1. Equipment and parameters for thermally spraying the heat-generating layer 16 and the optional thermal insulation layer 18 are set forth in U.S. Pat. No. 6,358,466, the teachings of which are incorporated herein by reference.

Once the complete composite pour tube is thermally sprayed, the outer dimensions can be machined by diamond grinding (embedded diamonds) and the ends of the pour tube are cut off to high precision using a diamond tool.

The in-situ method embodiment of the invention involves flowing a molten metallic material with sufficient oxygen affinity (e.g., molten titanium metal or alloy) through the pour tube for sufficient time thereby transforming the inner yttria layer to oxygen-deficient yttria at the melt-contacting interface, represented by $Y_2O_{3-x}$ where x is from 0.01 to 0.1. The method is conducted as described below for purposes of illustration and not limitation.

The thermal sprayed melt pour tube 11 is inserted into the gas atomizing apparatus of FIG. 2 having a crucible 20 and crucible closure (not shown) for controlling supply of molten metal or alloy to stoichiometric yttria melt-contacting inner passage 11a of the pour tube 11 for atomization by atomizer gas pursuant to U.S. Pat. No. 6,358,466 supplied via supply pipe 40. A molten material with sufficient oxygen affinity (e.g., titanium) is then flowed through the pour tube 11 at sufficient melt superheat, and for sufficient time that the stoichiometric yttria inner layer is transformed to the sub-stoichiometric yttria. During this process, the atomization gas is not flowing and the discharged material is collected in a containment vessel and discarded due to excess contamination. Once it is deemed that the yttria layer of the pour tube has concluded its transformation, the atomization gas can be initiated and metallic powders of high purity may be attained.

By use of the atomizer melt pour tube 11 with the oxygen-deficient inner melt-contacting layer 14, the chemical potential gradients of oxygen to dissolve in the melt are reduced, thus reducing the driving force for dissolution in the melt. As a result of the reduced driving force for dissolution in the melt, the melt pour tube 11 having the oxygen-deficient inner melt-contacting layer 14 will react less with the melt than a fully stoichiometric one under the same melt contact time and melt temperature conditions. This gives a distinct advantage of stability over a pour tube having a stoichiometric yttria inner melt-contacting layer.

The melt pour tube of the present invention thus can be mated to existing close-coupled, high pressure gas atomization apparatus of the type illustrated in U.S. Pat. No. 6,358,466 to allow for the mass production of fine reactive metal and reactive metal alloy (e.g., titanium and the like) powder particles. These powder particles are ideal for metal injection molding (MIM) and powder injection molding (PIM) components. The ability to atomize fine reactive powders at the bulk scale (i.e., greater than 500 tons annually) should drastically reduce the manufacturing cost of such powders.

Figure 3:
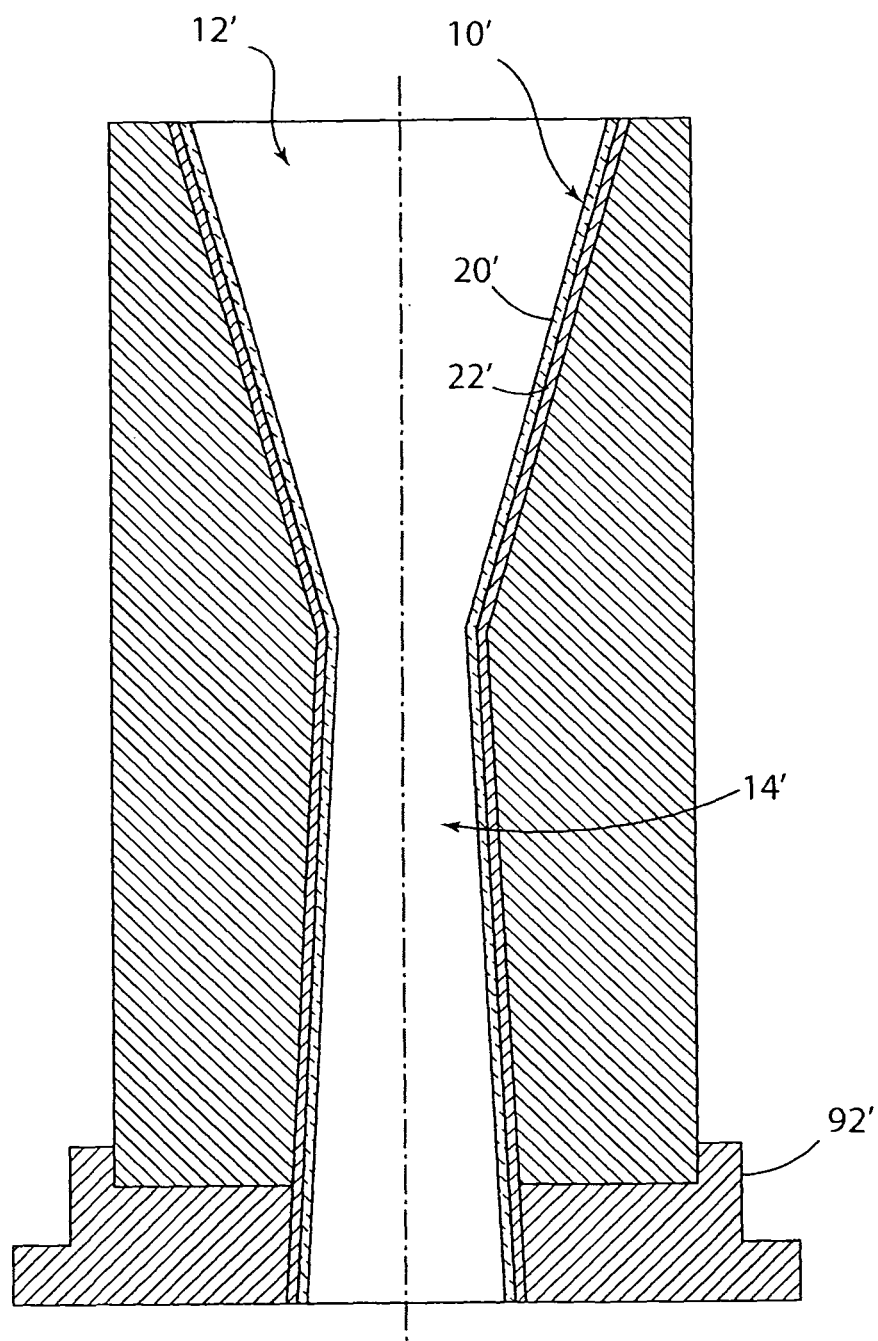
FIG. 3 is a longitudinal sectional view of a composite open-bottom tubular continuous casting mold according to another embodiment of the invention.

Another illustrative embodiment of the present invention involves a tubular composite continuous casting mold 10', FIG. 3, for use in a continuous casting apparatus as described in U.S. Pat. No. 6,425,504 of common assignee, the teachings of which are incorporated herein by reference. The methods of producing the sub-stoichiometric oxide melt-contacting layer described above also apply to this embodiment.

The composite continuous casting mold 10' includes an open-bottom tubular crucible or receptacle section 12' and integral open-bottom tubular withdrawal section 14'. The crucible section 12' and the withdrawal section 14' each include an oxygen-deficient (sub-stoichiometric) yttria inner melt-contacting layer 20' for contacting the melt flowing from the crucible section toward the withdrawal section. The oxygen-deficient yttria melt-contacting layer 20' is of the type and is formed as described with respect to fabrication of the melt pour tube of FIG. 1.

Once the tube formed by the inner melt-contacting layer 20' is completed and heat treated to convert it to the oxygen-deficient-yttria melt-contacting layer, the tube is plasma sprayed with an outer refractory metal (e.g. tungsten) layer 22' with a thickness of about 0.8 to about 1.2 mm to impart shock resistance to the integral crucible and withdrawal sections as described in U.S. Pat. No. 6,425,504, the teachings of which are incorporated herein by reference.

Once the complete composite casting mold 10' is thermally sprayed, the outer dimensions can be machined by diamond grinding (embedded diamonds) and the ends of the casting mold are cut off to high precision using a diamond tool.

The continuous casting mold 10' then is supported on support plate 92' and used in a continuous casting apparatus shown in FIGS. 2 and 4 of U.S. Pat. No. 6,425,504 incorporated herein by reference. By use of the continuous casting mold 10' with the oxygen-deficient inner melt-contacting layer 20', the chemical potential gradients of oxygen to dissolve in the melt are reduced, thus reducing the driving force for dissolution in the melt. As a result of the reduced driving force for dissolution, the continuous casting mold 10' having the oxygen-deficient inner melt-contacting layer 20' will react less with the melt than a fully stoichiometric one under the same melt contact time and melt temperature conditions. This gives a distinct advantage of stability over a pour tube having a stoichiometric yttria inner melt-contacting layer.

Example #1

High purity yttria powder with a size <10 micron was pressed axially pressed into two green 1 cm diameter pucks that were approximately 1 cm high. A bench-top drill press was used to drill a cavity into the pucks, thus forming small individual crucibles. The crucibles were then placed in a tantalum can under a vacuum of $1\times10^{-6}$ torr and heated to 1800° C. for 16 hours to transform then to sub-stoichiometric yttria.

One of the crucibles was then placed in a furnace at 1200° C. for approximately 10 minutes to revert it back to stoichiometric yttria.

Small samples of high purity titanium were placed into the yttria crucibles and were placed inside a tantalum can sheathed with pyrrolitic graphite. The can was placed in a high vacuum to $1\times10^{-6}$ torr before backfilling to a sub-atmospheric pressure of ultra high purity argon. The furnace was ramped up to 1800° C. (i.e., approximately 140° C. above the melting temperature of titanium) and held for 15 minutes before cooling. The titanium melted in the yttria crucibles and re-solidified upon cooling.

Examination was conducted by cross-sectioning the stoichiometric and sub-stoichiometric crucibles with a diamond saw. Upon sectioning, the re-solidified titanium in the sub-stoichiometric yttria crucible was easily removed (i.e., it fell out when inverting the crucible) indicating a weak bond and limited reaction with the sub-stoichiometric crucible. The stoichiometric yttria did not release its re-solidified titanium. SEM analysis showed significant reductions if crucible wear and far fewer contaminant yttria precipitates within the sub-stoichiometric yttria crucible compared to the stoichiometric yttria crucible.

Example #2

A pour tube fabricated with a stoichiometric yttria melt contacting layer was fabricated as described by U.S. Pat. No. 6,358,466. The pour tube was installed in a cold wall crucible atomization system located at the University of Birmingham in the United Kingdom. Molten Ti-6Al-4V (wt %) was melted in the cold wall crucible. An electromagnetic field around the pour tube was generated with an induction power supply and was tapped by the thermal radiation generated by the heat-generating layer and was directed to the interior cavity of the pour tube. The molten titanium alloy flowed through the pour tube, free fell for approximately two seconds, and was subsequently contained in a mild steel can lined with boron nitride. The molten Ti-6Al-4V had a melt exit temperature of 1675° C. and was flowed for a duration of 45 seconds.

Post-experiment analysis of the pour tube was conducted by cross-sectioning the pour tube perpendicular to the melt flow direction. The cross-section analysis revealed that the aforementioned stoichiometric yttria was transformed to sub-stoichiometric yttria at the melt contacting interface, this transformation was due to the molten Ti-6Al-4V extracting oxygen from the melt contacting stoichiometric yttria layer. An extended period of molten Ti-6Al-4V flow would allow for a full transformation of the melt-contacting stoichiometric yttria layer to sub-stoichiometric yttria as a method embodiment of the invention for transforming the stoichiometric yttria to sub-stoichiometric yttria. Upon full transformation of the melt contacting layer with a sacrificial amount of molten metal flow for in-situ transformation, the atomization process can commence with the in-situ transformed sub-stoichiometric yttria layer.

Although the invention has been described in detail with respect to certain embodiments thereof, those skilled in the art will appreciate changes and modifications can be made thereto without departing from the scope of the invention as set forth in the appended claims.

The invention claimed is:

1. A method of providing a non-sacrificial molten metallic material through a pour tube melt containment member to an atomizer, comprising:
    initially flowing a sacrificial, high oxygen affinity, molten metallic material through the pour tube melt containment member, to thereby contact a substantially stoichiometric rare earth oxide layer in the pour tube melt containment member, to transform said substantially stoichiometric layer into an oxygen-deficient rare earth oxide layer, during which atomizing gas is not being provided to the atomizer,
    and then flowing the non-sacrificial molten metallic material through the pour tube melt containment member to the atomizer, wherein the non-sacrificial molten metallic material is contacting the oxygen-deficient rare earth oxide layer of the pour tube melt containment member, during which atomizing gas is provided to the atomizer, such that said oxygen-deficient rare earth oxide layer reacts less with the non-sacrificial molten metallic material than a fully stoichiometric rare earth oxide layer, thereby reducing contamination of the non-sacrificial molten metallic material flowing therethrough.

2. The method of claim 1 wherein the non-sacrificial molten metallic material comprises at least one of titanium and zirconium.

3. The method of claim 1 including discarding the sacrificial molten metallic material after it flows through the pour tube melt containment member and the atomizer.

4. The method of claim 1 wherein contamination by at least one of oxygen and rare earth metal into the non-sacrificial molten metallic material flowing to the atomizer is reduced.

* * * * *